Feb. 15, 1949.　　　　E. M. SMITH ET AL　　　　2,461,780
STARTING GATE
Filed Aug. 12, 1946　　　　　　　　　　　　4 Sheets-Sheet 4
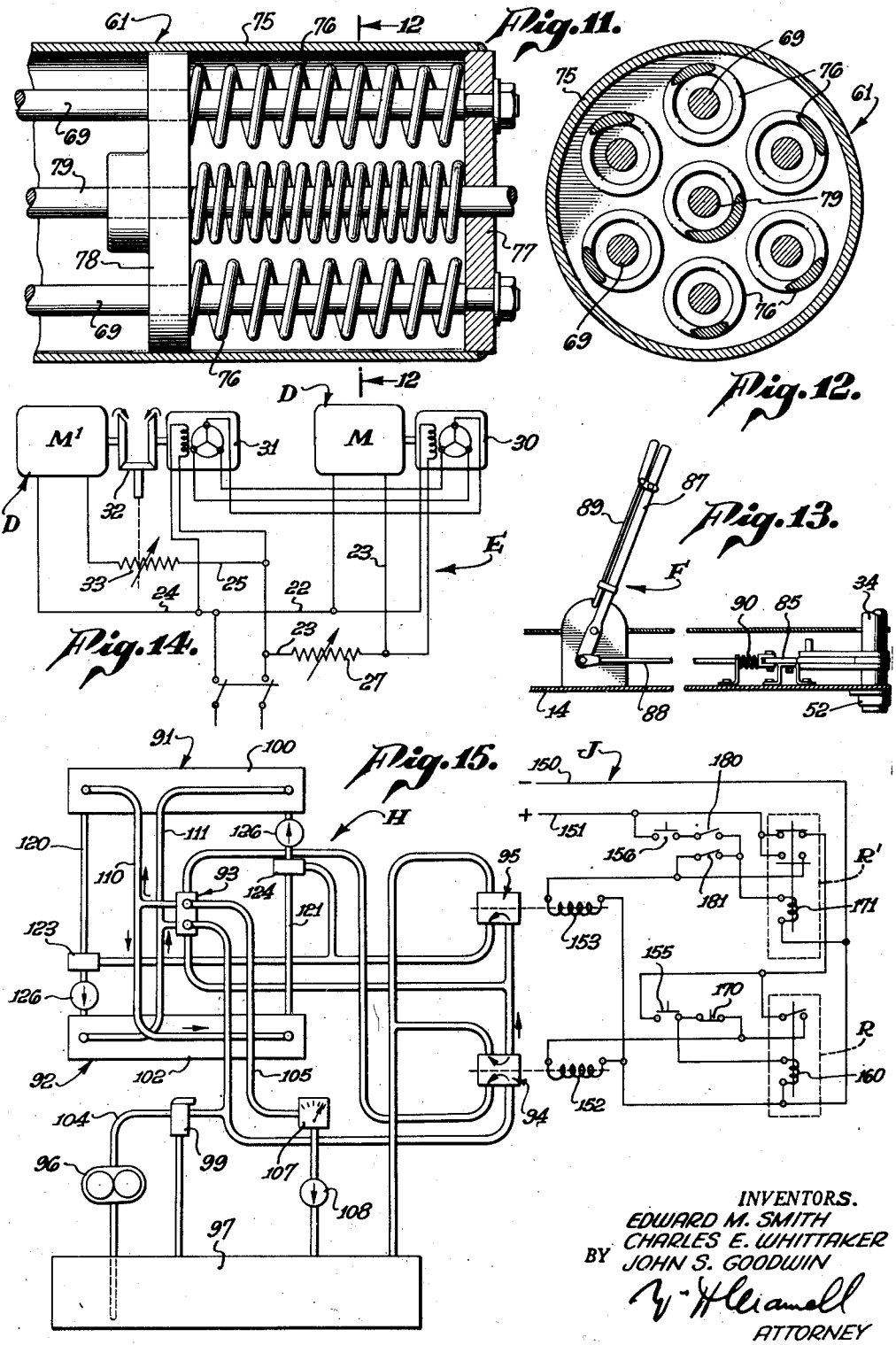
INVENTORS.
EDWARD M. SMITH
CHARLES E. WHITTAKER
BY JOHN S. GOODWIN
ATTORNEY Patented Feb. 15, 1949

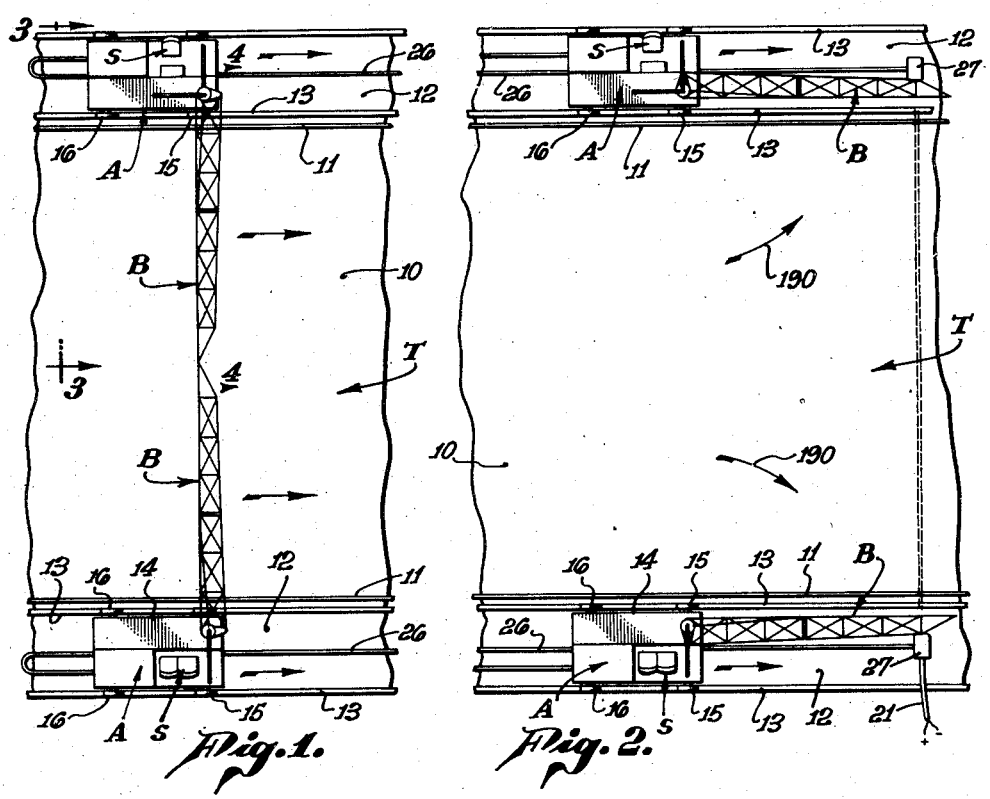
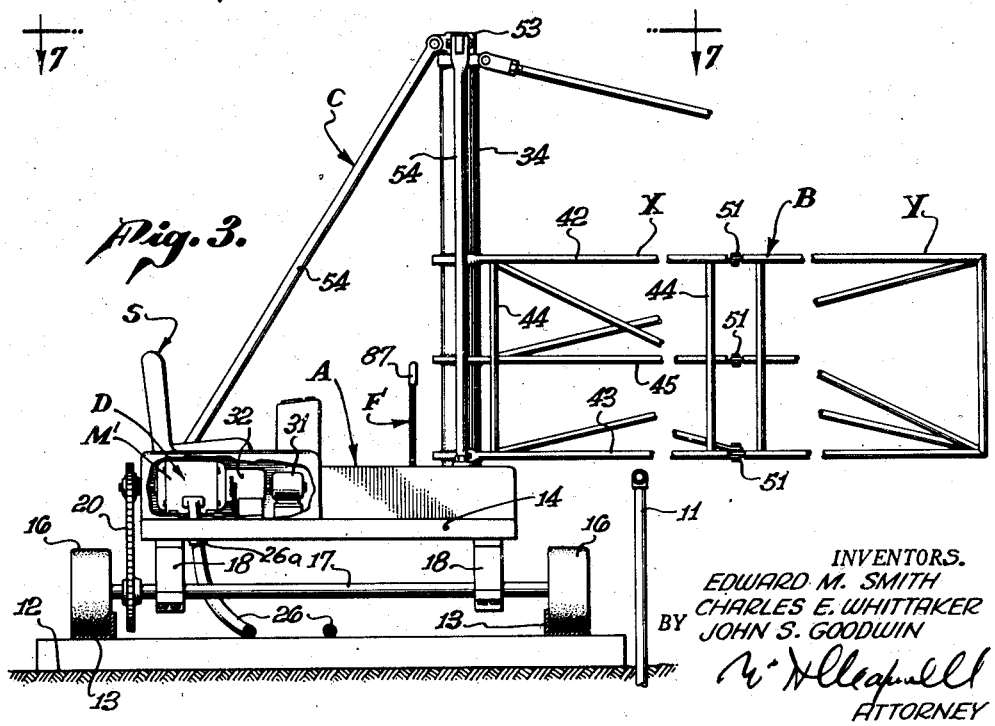

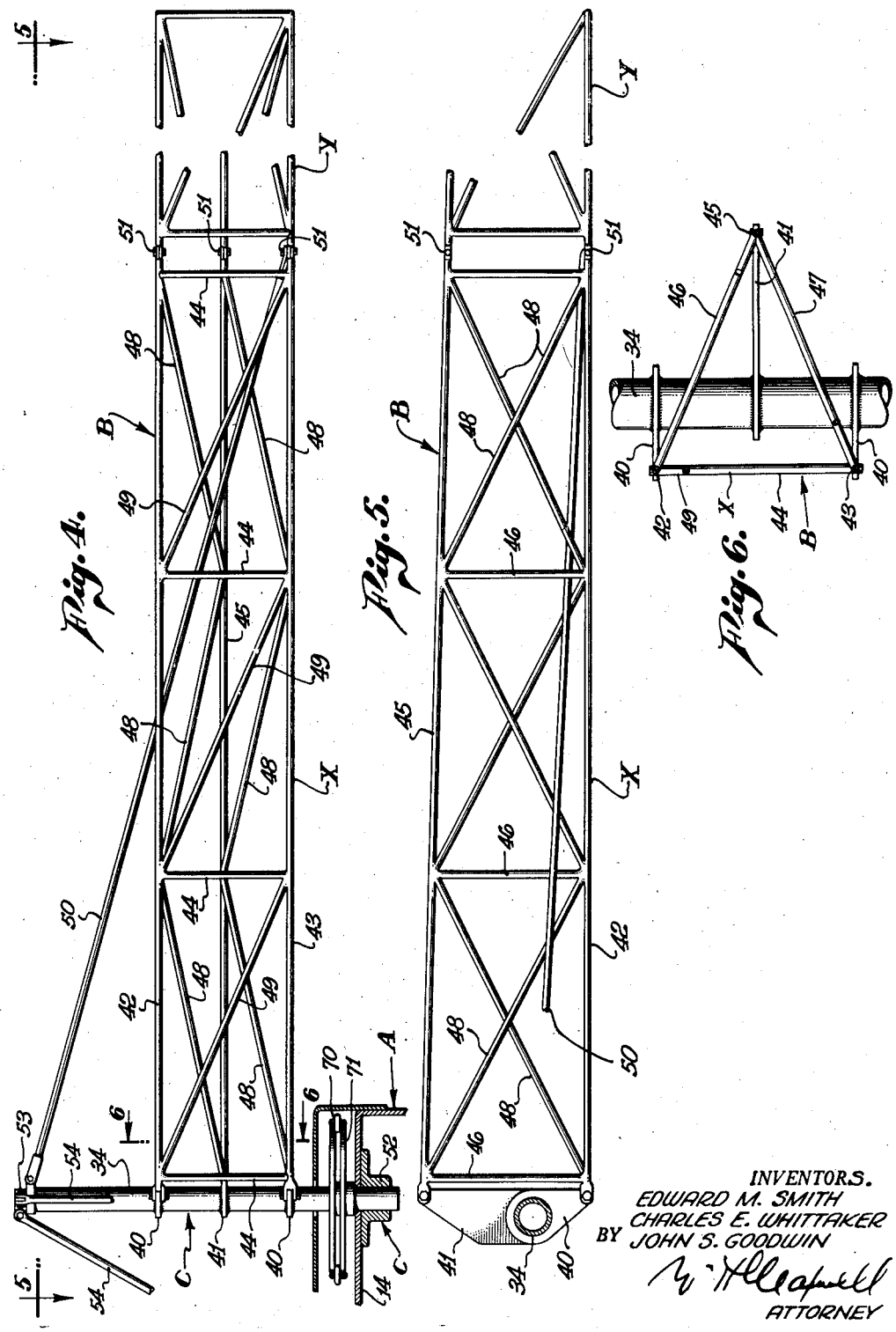

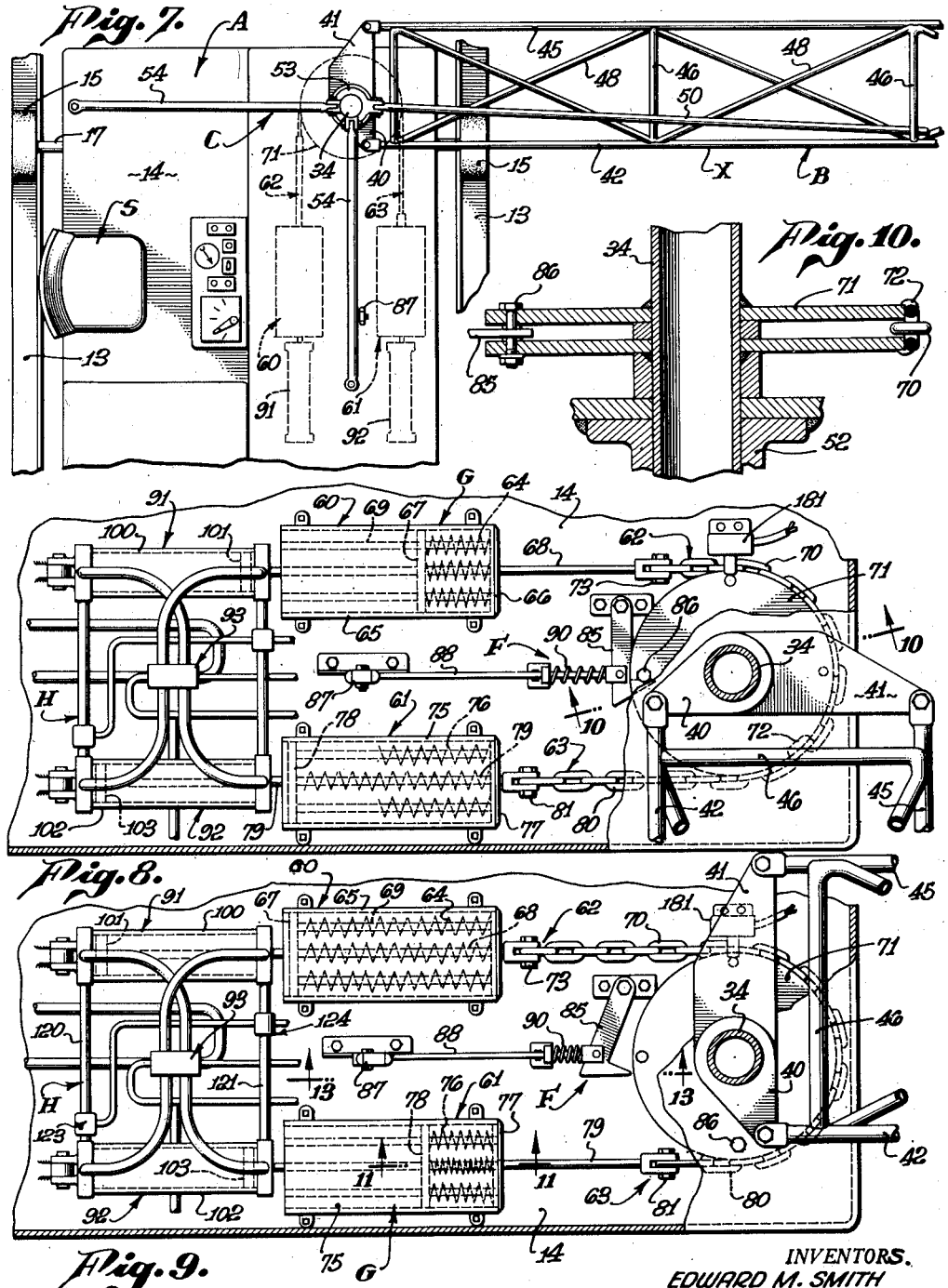

2,461,780

UNITED STATES PATENT OFFICE 2,461,780

STARTING GATE

Edward M. Smith, Charles E. Whittaker, and John S. Goodwin, Whittier, Calif., assignors to Globe Oil Tools Company, Los Nietos, Calif., a corporation of California Application August 12, 1946, Serial No. 689,910

17 Claims. (Cl. 119—15.5)

This invention has to do with a starting gate to be used at or in connection with a race track to facilitate starting of horse races, and it is a general object of the invention to provide a simple, dependable and effective control or starting gate whereby a group of horses can be effectively and accurately started in a race so that they are in motion when the race starts, or in other words so that they are given a running start.

The control gate of the present invention is useful, generally, in controlling or starting horse races. However, in its preferred form it involves features that make it particularly advantageous for use where it is desired to start races while the horses are in motion, or where it is desired to give the animals a running start. Heretofore considerable difficulty and hazard has been experienced in attempting to start races with the horses in motion and devices heretofore proposed or used for controlling or starting races have been generally complicated and not altogether satisfactory, and have been practically useless in handling horses in motion. One of the outstanding difficulties of devices heretofore proposed and used is that they involve elaborate or complicated structure such as individual gates, one for each horse, or controls that are in the nature of barriers until they are lifted above the horses' heads. Such devices or units of equipment are not only cumbersome and diffcult to operate in practice, but they generally scare the horses or cause them to shy or be deflected from their courses, to the end that they are dangerous or cause confusion and do not result in a satisfactory running start.

It is a general object of our present invention to provide a starting gate for use on or in connection with a race track and which is such that when closed it forms a barrier not objectionable to the animals being controlled and which opens in a manner completely freeing the horses of all hazards so that they are not distracted or caused to get out of control. The structure that we provided involves one or more gate sections. In its preferred form we have provided two gate sections which, when closed, form a structure appearing as an effective barrier but not so dissimilar from an ordinary fence as to cause horses to be alarmed thereby. In action the gate sections do not swing up or are not operated in any manner to distract or confuse the horses, but rather swing in the direction in which the horses are running and ahead of the horses to move out of the way of the horses, leaving the horses to continue totally unmolested on their courses. By eliminating all overhead hazards or objects we completely eliminate a most serious hazard, and by opening the entire course by moving two gate sections ahead and swinging them out of the way from the horses we, in effect, obtain a gate opening action with which horses are familiar and which does not distract or disturb them in any way.

It is another object of the present invention to provide an improved gate construction and mounting for a control of the general character referred to which structure is very light and consequently easily and quickly moved, and yet is such as to form an obstacle or barrier simulating a fence or the like.

When carrying out the invention in the preferred manner, as above described, we employ but two sections which, when in closed position, are end to end and extend completely across the track. Since the usual race track is of substantial width the gate or control sections are of substantial length and it is highly important for stability and dependability that they be reasonably rigid and yet it is important that they be very light, so that they can be moved quickly from the closed position to the fully open position where they are completely withdrawn from the track, all without the expenditure of excessive amounts of power and without employing heavy complicated equipment.

It is a further object of the present invention to provide a gate mechanism of the general character above referred to involving carriages that move lengthwise of the track carrying the gate sections with them, which carriages are equipped so that either one or both may be employed to carry the starter or operator, judges, camera man, or other such personnel. By providing a gate carriage which moves lengthwise of the track and carries a gate section with it, which gate section controls the starting of the horses and which carriage forms a conveyance for the starting official, we enable the starting official to easily and accurately judge the approach of the horses and determine the moment when they are reasonably abreast in order to start under equal conditions.

It is a further object of our invention to provide a starting gate of the general character referred to which involves various unique and practical mechanical features such as the operating means for the gate sections and the controls employed in connection therewith.

A further object of the invention is to provide a starting gate of the general character referred to which involves hydraulic means effective both to set or close the gate sections and also to release them when it is desired that they should open.

A further object of the invention is to provide a control of the general character referred to which involves not only hydraulic units or means but also electrical control devices which cooperate with the hydraulic equipment, to the end that the operator has convenient, practical control over the entire apparatus.

A further object of the present invention is to provide power driven carriages which carry the gate sections which carriages are connected by a synchronous control which ordinarily maintains uniform operation of the carriages so that the two main sections, although not mechanically connected and although supported from opposite sides of the track, move lengthwise of the track in perfect unison or synchronism.

The various objects and features of our invention will be fully understood from the following detailed description of a typical preferred form and application of the invention, throughout which description reference is made to the accompanying drawings, in which:

Fig. 1 is a plan view of a portion or section of a race track, showing the starting gate of the present invention applied thereto and showing the gate sections together or in closed position, and showing the carriages which support the gate sections in a retracted or starting position ready for movement lengthwise of the track in the direction in which the horses are to run. Fig. 2 is a view similar to Fig. 1, showing the carriages advanced along the track to a position near the end of their travel and showing the gate sections fully open or apart, leaving the track clear and unobstructed. Fig. 3 is an enlarged detailed view taken substantially as indicated by line 3—3 on Fig. 1. Fig. 4 is an enlarged view taken substantially as indicated by line 4—4 on Fig. 1, showing mainly, one of the gate sections as it appears from the track when viewed in the direction that the horses approach it. Fig. 5 is a plan view of the structure shown in Fig. 4, being a view taken as indicated by line 5—5 on Fig. 4. Fig. 6 is a transverse sectional view taken as indicated by line 6—6 on Fig. 4. Fig. 7 is an enlarged plan view of one of the carriages taken as indicated by line 7—7 on Fig. 3, showing a part of the gate section that is carried thereby and showing the general arrangement of the essential parts. Fig. 8 is an enlarged plan view of a part of the structure shown in Fig. 7, with portions broken away to illustrate details of the mechanism and showing the gate section in the closed or unactuated position. Fig. 9 is a view similar to Fig. 8, showing the gate section open or fully actuated. Fig. 10 is an enlarged detailed sectional view taken substantially as indicated by line 10—10 on Fig. 8. Fig. 11 is an enlarged, detailed sectional view taken as indicated by line 11—11 on Fig. 9. Fig. 12 is a transverse sectional view taken as indicated by line 12—12 on Fig. 11. Fig. 13 is a sectional view taken as indicated by line 13—13 on Fig. 9. Fig. 14 is a diagrammatic view showing the power circuit by which the carriages of the gate are driven and illustrating the synchronous control between the motors of the two carriages and Fig. 15 is a diagrammatic view illustrating the control system that we have provided, showing the manner in which the units of the hydraulic equipment are related and how that equipment is under control of the electrical circuit which involves switches manipulated by the operator of the apparatus.

Our invention, as above pointed out, is applicable, generally, to race tracks and is useful where it is desired to effectively and accurately control the start of races, preferably although not necessarily, races where it is desired that the horses be given a running start. It is to be understood that in carrying out our invention we may vary it considerably in form and detail to meet particular track conditions or to best accommodate the apparatus to the particular type or form of racing to be controlled. In the drawings we have illustrated a typical form and application of the invention and have shown such construction applied to a typical race track T which involves a track proper, or course 10 over which animals run, side rails or fences 11 at the sides of the course 10 and running parallel therewith, and aprons or marginal portions 12 outward of and running parallel to the fences 11 which portions are throughout the major portion of the ordinary race track clear of all obstacles, so that view of the animals on the course 10 is not in any way obstructed.

In carrying out our invention or in applying our invention to a typical race track T such as we have referred to, we utilize the marginal portions 12 immediately outside of the fences 11 or running parallel with the course 10 if the track is without fences, and we utilize lengths of such marginal portions in the portion of the track where races are started sufficiently long to facilitate full operation of the apparatus as will be hereinafter described.

The preferred form of apparatus that we provide involves, generally, two carriages A, each supporting or carrying a gate section B and the carriages A are operated along the marginal portions 12 of the track hereinabove referred to. If the track is narrow we may need only one carriage. The carriages A are preferably wheeled vehicles and to facilitate smooth uniform operation we prefer that they be operated on rails laid lengthwise of the marginal portions 12. In the form of the invention illustrated a pair of rails 13 extends lengthwise of each of the marginal portions 12 so that the two pairs or sets of rails are parallel with each other and with the track and occur opposite each other or at opposite sides of the track. The rails are laid along the portions 12 to provide supports for the carriages A sufficiently long to amply accommodate the desired movements of the carriages.

The carriages A at the two sides of the track may be alike or identical except for the variations that will be hereinafter described, and in general each carriage involves a frame or platform 14, a pair of front supporting wheels 15 and a pair of rear supporting wheels 16, the wheels being carried by axles 17 connected to the platform by suitable brackets 18. It is desirable, in practice, that the carriages be made as low or compact as possible so that they are close to the ground and are not such as to obstruct full view of the course 10.

In accordance with our invention we provide one or more seats S on each carriage and one of these seats is located on one of the carriages convenient to the controls that will be hereinafter described, so that the starter of the race can occupy that seat and when he does so has convenient access to all of the controls.

In addition to the general elements hereinabove referred to the structure that we have provided involves, generally, mounting means C by which each gate section is mounted on or supported from a carriage, power means D on each carriage for driving or propelling it, a control system E regulating and synchronizing the prime movers of the power means, a mechanical latch means F in connection with each gate section for releasably latching it in the closed position, operating means G for operating the gates, and a control system involving, generally, a hydraulic control H, and an electrical control J, so related or coupled that the action of the control H is responsive to the control J.

The power means D provided on or in connection with each carriage A serves to drive or propel the carriage along its supporting rails 13 and to do this it preferably involves a suitable prime mover or motor and a drive from the motor to one or more wheels of the carriage. In practice we may use any suitable form or type of prime mover such as a motor or an internal combustion engine. In the case illustrated we show electric motors to drive the carriages and we show a motor M on one carriage and a motor M' on the other carriage. In practice each motor is connected with an axle 17 carrying a pair of wheels through a suitable mechanical drive, for instance, as shown in the drawings, we may employ a chain drive 20. Suitable energy may be supplied to the motors M and M' in any suitable manner. In the case illustrated we show the main power circuit carried to a point adjacent the track by a power cable 21 and power lines 22 and 23 connect the cable with motor M while power lines 24 and 25 connect the cable with motor M'. The power lines are preferably incorporated in flexible cables 26 which extend from suitable junction boxes 27 and which may lie on the ground between the carriage supporting rails, so that they extend from the junction boxes to the carriages with sufficient slack or play to allow for the desired movement of the carriages relative to the junction boxes. The cables 26 may connect to the carriages A at 26a.

The means E serves to regulate and synchronize the motors M and M' so that the carriages operate in unison or in synchronism. In the arrangement illustrated the motor M may be considered the primary or master motor and it is under control of a rheostat 27 or the like, so that it can be operated at any desired speed, and the control for the rheostat is located at or near the seat provided on the carriage propelled by motor M so that it is readily accessible to the operator or starter.

The synchronous connection involved in means E connecting motors M and M' may be any suitable synchronous connection, although it is preferably one which contemplates connection of the motors M and M' or of parts in connection therewith through wires, which wires can connect to the cables 26 so that the connection between the carriages, even though electrical, is concealed and as simple as possible. We may if desired employ a cable connection carried by the gates and involving a disconnect plug or connection where the gates are adjacent each other which connection parts or releases when the gates open.

In the case illustrated we show a synchronous motor 30 coupled to and driven by the motor M so that its speed of operation is directly related to that of motor M. A corresponding or similar synchronous motor 31 is coupled with the motor M' through a differential control device 32 which control device operates a rheostat 33 in the circuit to motor M'. From an examination of Fig. 14 it will be apparent that as motor 30 operates the motor 31 will operate at a corresponding speed and if motor M' is not operating at the same speed as motor M the differential mechanism 32 functions to actuate the rheostat 33 varying the speed of motor M' until it corresponds with that of motor M.

The gate proper of the apparatus that we have provided involves one or more gate sections B and where we provide two carriages A, as we have shown in the drawings, we preferably provide or employ two like gate sections B and since the gate sections are alike we will hereinafter describe one of them in detail such description being applicable to both. In the preferred relationship of parts the gate sections B are horizontally disposed frame structures which, in general appearance, simulate portions of a fence or the like, and we prefer to mount and proportion the two gate sections B so that they extend inwardly in opposite directions or toward each other to come together or closely approach each other at the center of the course 10, although it is unnecessary, so far as the invention is concerned, that they touch or be mechanically connected in any way, since the carriages on which they are mounted are synchronously related, as hereinabove described.

Each gate section B involves, primarily, a vertically disposed column 34 by which the gate section is connected to its supporting carriage and which serves as a carrier or base for the various other parts of the gate section. In the preferred form of the invention illustrated in the drawings a pair of vertically spaced arms 40 project from one side of the column 34, the rear side of the column when the gate is closed, while a single central arm 41 projects from the forward side of the column at a point intermediate the arms 40. We prefer, in practice, that each gate section should involve one or more horizontally disposed frame-like units and in the case illustrated we have shown each section as involving an inner unit or body X and an outer unit or tip portion Y.

In the construction shown the body X includes, generally, two vertically spaced beams 42 and 43 which connect to or are carried by the arms 40 and project horizontally therefrom to extend in a direction truly transverse of the course 10 when the gate is closed, as shown in Fig. 1. The beams 42 and 43 are joined by vertical posts 44 at suitable intervals along the length of the body, one of which posts preferably occurs at or near the outer end of the body. Diagonal braces 49 extend between opposite corners of the rectangular frame units formed by the beams and posts, it being preferred to provide one brace at each opening and to locate it so that it extends downwardly and outwardly in such opening, as shown in Fig. 4 of the drawings.

An intermediate beam 45 extends substantially parallel with the front beams 42 and 43 but is forward thereof relative to the direction in which the carriages move and the gates open as the device operates. The intermediate beam 45 connects to or is carried by the intermediate arm 41 and it extends to a point at or near the outer end of the body. Strut-like elements 46 extend downwardly and forward from beam 42 to beam 45 while corresponding strut-like elements 47 extend upwardly and forward from beam 43 to beam 45, the strut-like elements preferably being located and connected to the beams 42 and 43 where posts 44 are located. Through this construction the body of the gate section is a triangular frame-like structure when viewed in cross section, as shown in Fig. 6. In practice we may provide diagonal braces 48 between each of the beams 42 and 43 and the intermediate beam 45 to act in a manner similar to the diagonal braces 49.

In addition to the various parts or elements hereinabove described each gate section preferably also involves a tie rod 50 extending from a point on the column 34 somewhat above the uppermost arm 40, downwardly and outwardly to the outer lower corner of the body X where it connects at or near the point where the beams 43 connect with the outermost post 44 of the body X.

The tip Y of the gate section is preferably coupled or joined to the outer end of the body X to form a rigid extension or continuation thereof and, as shown in the drawings, it may include beams, posts, struts and diagonal braces corresponding in form and arrangement with those just described, so that the tip is of the same general character as the body and, for all intents and purposes, is merely a continuation thereof. In practice we may employ suitable releasable fasteners such as bolt connections 51 to connect the tip to the body. By providing for separation of the tip from the body we make it convenient to handle the apparatus when it is necessary to transport it from one location to another, and furthermore, the structure is readily made applicable to any track or to tracks of various widths by merely employing tips of suitable length on the body X.

The mounting means C for the gate section may involve any suitable bearing device 52 carried on or by the platform 14 of the carriage A so that the column 34 of the gate section is rotatably mounted in a vertical position, as shown throughout the drawings. The mounting may further include a cap or head 53 rotatably engaged with the upper end of the column 34 and suitable braces 54 extending from the head to the platform, as shown in the drawings.

The operating means G for each gate section B involves, generally, structure operable to move the gate section from the closed position shown in Fig. 1 to the open position shown in Fig. 2. In the preferred form of the invention shown in the drawings the power system or means G involves, generally, what we will term a drive or power unit 60, a check or breaking unit 61 and driving or operating connections 62 and 63 between the units 60 and 61, respectively, and the column of the gate section.

The drive or power unit 60 is a spring unit involving a plurality of compression springs 64 arranged in a case 65 between a head 66 of the case and a head 67 slidable longitudinally in the case. The head 67 is fixed on an operating rod 68 that projects from the case at each end thereof. In practice we prefer one or more compression springs 64 in the case. For instance, we may employ an arrangement of springs such as shown in Figs. 11 and 12, and in such case it is preferred that the springs be carried on guide rods 69.

The operating connection 62 between the unit 60 and the column 34 includes a flexible element such as a chain 70 having one end fixed to a drum 71 on the column 34 as at 72. The other end of the chain connects to the rod 68, as at 73. The various parts are arranged and proportioned so that when the column 34 is turned to a position where the gate section carried thereby is closed or extends transversely of the course 10, chain 70 is wound on the drum 71 causing the head 67 to be moved toward the head 66 putting the springs 64 under compression so that they tend to yieldingly urge the head 67 away from the head 66 and consequently turn the column 34 in a manner to swing the gate section.

The check or breaking unit 61 is preferably a spring unit involving a case 75 carrying a plurality of springs 76 which act between a head 77 of the case and a head 78 movable longitudinally in the case and carried on a rod 79 that projects from each end of the case. It is preferred to employ a plurality of springs 76 in the unit 61 and one of these springs is preferably longer than the others so that it normally yieldingly holds the head 78 at the end of the case remote from the head 77. The other springs 76 in the case 75 are preferably short and located so that they are not engaged by the head 78 and are only materially compressed as the head 78 closely approaches the head 77 which occurs when the head 67 of unit 60 approaches the end of case 65 remote from the head 66 of case 65.

The connection 63 may be similar to the connection 62. For instance, it may involve a chain 80 connected to the drum 71 as at 72 and connected to the rod 79 as at 81. The parts are related so that the chains 70 and 80 wind onto the drum in opposite directions, that is, so that when chain 70 is wound onto the drum as shown in Fig. 8, chain 80 extends from the drum, whereas when chain 80 is wound onto the drum as shown in Fig. 9, chain 70 extends from the drum.

From the foregoing description it will be apparent that the means G involves a spring mechanism which is such that the springs 64 in unit 60 are put under compression when the gate section is moved to a closed position and thus function as a power accummulator or energy storing mechanism, while the unit 61 serves as a checking device or break to stop movement of the gate section as it swings from the closed position to the open position under influence or under the action of the springs 64.

In practice either one or both of the carriages or gate sections may be provided with a mechanical latch means F whereby the gate section carried thereby can be mechanically latched in the closed position where the springs 64 are under compression ready to be released and to act to swing the gate section open. The particular latch means illustrated in the drawings involves a pivoted latch member 85 cooperating with a stop 86 on the drum 71 and a pivoted hand lever 87 is coupled with the latch 85 by a connecting rod 88 and can be latched in set position by a grip operated latching device 89. A spring 90 is arranged to normally yieldingly urge the latch 85 into active position.

The control system, as above described, involves generally a hydraulic system H and an electrical system J. The hydraulic system H involves, generally, two oppositely acting cylinder and piston units 91 and 92, a main control valve 93, an operating or setting valve 94 and a release valve 95. The hydraulic system further includes various other elements or accessories such for example as a means or pump 96 for delivering fluid under pressure, a reservoir 97 from which the pump is supplied, a pressure regulating valve 99 through which the pump delivers fluid to the system and various other parts, all of which will be apparent from the drawings or will be hereinafter described.

The cylinder and piston unit 91 involves, generally, a cylinder 100 and a piston 101 operating in the cylinder 100 and carried by the rod 68 which extends from unit 60. The unit 92 includes a cylinder 102 and a piston 103 operating in cylinder 102 and carried by rod 79 projecting from unit 61.

The pressure generating device or pump 96 may be any suitable pump that will operate to deliver fluid at the desired pressure and in the necessary quantity, and it may be driven by any suitable source of power. The pump 96 is shown receiving fluid from reservoir 97 and delivering it to a line 104 which conducts it to the inlet of valve 93. An exhaust or drain line 105 conducts fluid from the outlet of valve 93 to the reservoir 97 through a variable orifice device 107 and a check valve 108.

The valve 93 is such as to be operable to deliver fluid from line 104 either to line 110 while it is being exhausted from a line 111, or to deliver it to line 111 while it is being exhausted from line 110. The line 110 extends to the lefthand end of cylinder 100 and to the righthand end of cylinder 102 while the line 111 extends to the righthand end of cylinder 100 and to the lefthand end of cylinder 102. It will thus be apparent that by operation of the valve 93 fluid can be admitted to one end of one of the hydraulic units and be exhausted from the other end thereof, while it is being admitted to the other end of the other hydraulic unit and is being exhausted therefrom.

Through this hydraulic system fluid under pressure from pump 96 can be utilized to actuate the hydraulic units 91 and 92 so that the unit 60 of means G is operated in a manner to put the springs 64 thereof under compression as shown in Fig. 8 and on reaching that position the cylinders of the units 91 and 92 are filled with fluid so that the hydraulic parts or units serve as a lock to hold the mechanism in the position thus described.

To effect operation of valve 93 to a position where the units 91 and 92 operate to move the parts to the closed position shown in Fig. 8 we provide the loading or setting valve 94. This valve is connected with the source of fluid under pressure, with the reservoir 97 and with control cylinders or the like at the ends of valve 93 so that when it is positioned operable to admit fluid under pressure to one side of the valve 93 to operate valve 93 the fluid is supplied to line 110 moving piston 101 to the right and piston 103 to the left. To effect operation of valve 93 to a position where the units 91 and 92 operate to allow the gate to open as shown in Fig. 9, the valve 94 is positioned to admit fluid under pressure to valve 95 and to the other side of the valve 93 to operate valve 93 so that fluid is supplied to line 111 moving piston 101 to the left and piston 103 to the right. When the units 91 and 92 operate to close the gate the fluid exhausted from the units passes through line 105 and the flow restricting means 107. The flow restricting means can be regulated to prevent excessively rapid initial travel of the gate, and may be so regulated as to cause relatively slow closing movement of the gate.

To facilitate rapid unloading or discharge of the cylinders 100 and 102 so that the apparatus moves rapidly when released we provide a by-passing connection 120 between the lefthand end of cylinder 100 and the lefthand end of cylinder 102, and a by-pass connection 121 between the righthand end of cylinder 100 and the righthand end of cylinder 102. These by-pass connections are provided with valves 123 and 124, respectively, which are open when the valve 95 opens to release the mechanism and check valves 126 are provided to prevent flow in the by-pass connections except in the desired direction.

The electrical control J provides for convenient and effective operation of the valves 94 and 95. It is energized by a circuit carried by lines 150 and 151 and it includes, generally, a coil or winding 152 for operating valve 94, a winding 153 for operating valve 95, a switch 155 for closing the circuit so that winding 152 is energized and a switch 156 controlling the circuit to winding or coil 153. The switch 155 is located convenient to the operator or starter and controls a relay R having a winding 160 energized when switch 155 is closed. When the relay R is operated by energization of winding 160 the circuit is completed through the coil 152 and the valve 94 is operated so that fluid is handled by the hydraulic control in a manner to move the parts to the position shown in Fig. 8. The relay R is connected in such a manner that momentary operation of switch 155 throws the circuit in operation, as above described, and it will remain operating so that the parts reach the position shown in Fig. 8. In order that the operator may reverse this operation whenever desired, a switch 170 is provided in the circuit to release the winding 160. When switch 170 is thus operated the valve 94 is positioned operable to open the gate slowly as above described.

The switch 156 controls a relay R' which has a winding 171 energized when the switch 156 is closed and when the winding 171 is energized the relay R' is operated and the coil 153 is energized, causing operation of valve 95 which puts the hydraulic system in the reversed condition or in a condition to release so that the parts move rapidly from the position shown in Fig. 8 to that shown in Fig. 9. A safety switch 180 is provided in the circuit to the winding 171 of relay R' so that danger of accidental release of the gate is minimized. A limit switch 181 is related to the drum 71 to be opened only when the drum reaches the two extreme positions, the position shown in Fig. 8 and the position shown in Fig. 9. The switch 181 is normally closed and is provided in the circuit to the winding 171 so that the relay R' is held closed whenever the drum 71 is between the two extreme positions. By providing the switch 181 the switch 156 need only be momentarily closed long enough to allow the gate to commence its opening operation.

The entire control means J is necessary on one carriage only. The valves corresponding to the valves 94 and 95 of the other carriage may be operated by coils corresponding to and connected in parallel with the coils 152 and 153, respectively. The electrical connections between these coils may be substantially identical with the connections between the motors M and M', including flexible cables such as the cables 26.

In operating the apparatus that we have provided the required electrical energy is supplied through cable 21 and is delivered to the carriages A through the cables 26, the cables 26 serving to conduct the wires for establishing the necessary synchronous connection between the motors of the two carriages. To start a race the horses are driven toward the closed gate or toward the closed gate sections, as shown in Fig. 1, and as they approach the gate the operator or starter can, by control of the rheostat 27 cause the carriages A to advance in the direction that the horses are approaching or so that the carriages with their gate sections move along or down the track ahead of the horses.

As the drivers bring the horses into line approaching the gate and when the starter has determined that the horses are reasonably well lined up, he operates the switch 156 which, through the hydraulic system H, releases the means G so that the two gate sections simultaneously swing open but move forward or in the direction indicated by the arrows 190 in Fig. 2, and in so moving they move away from the horses, thus completely clearing and opening the course 10 for free unobstructed passage of the horses down the track.

As the gates approach their full open positions the check units 61 check the movements of the gate sections and bring them to a stop, and it is to be understood, of course, that the starter once having opened the gate operates the rheostat 27 and brake means, which of course are incidental to the carriages, to bring the carriages to a stop.

The gate having been opened, to make it ready for another race or to close it, the operator closes switch 155 causing operation of valve 94 so that the hydraulic system H operates to move the parts back to the position shown in Fig. 8, and the carriages are reversed and operated back along the rails to the initial or starting position, which latter operation can be performed either before or after the gates are closed.

From the foregoing description it will be apparent that we have, by our present invention, provided a gate structure which is highly practical in that it in no way interferes with the horses or causes them to be disturbed in any way, but rather moves ahead of the horses as they come into line and then opens in gate fashion, which action does not disturb the horses. Furthermore, it will be apparent that we have provided an apparatus which is simple and compact so that it does not obscure the view of those interested in witnessing the start of the race, and it provides a very effective carrier for the starter officials, camera men, or other such persons.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. A race track having a course along which the race is run, a carriage operative lengthwise of the course at the margin thereof, motor means operatively associated with said carriage for propelling the same, a horizontally disposed gate carried by the carriage on a vertical pivot and operable from a closed position transverse of the course to an open position entirely clear of the course, locking means carried by said carriage and releasably connected with said gate to retain the same in such closed position, means operatively associated with said locking means to release the same, and means carried by said carriage and operatively connected with said gate to open the gate while the carriage is in operation by swinging the gate in the direction that the carriage is operating.

2. A race track having a course along which the race is run, a carriage operative lengthwise of the course at the margin thereof, motor means operatively associated with said carriage for propelling the same, a horizontally disposed gate carried by the carriage on a vertical pivot and operable from a closed position transverse of the course to an open position entirely clear of the course, manually controlled locking means carried by said carriage and releasably connected with said gate to retain the same in such closed position, means operatively associated with said locking means to release the same, and means carried by said carriage and operatively connected with said gate to open the gate while the carriage is in operation by swinging the gate in the direction that the carriage is operating.

3. A race track having a course along which the race is run, carriages operative lengthwise of the course at the margins thereof, motor means operatively associated with each of said carriages for propelling the same, a horizontally disposed gate section carried by each of said carriages on a vertical pivot and operable from a closed position transverse of the course to an open position entirely clear of the course, locking means carried by each of said carriages and releasably connected with said gate section carried thereby to retain the same in such closed position, means operatively associated with said locking means to release the same, and means carried by each of said carriages and operatively connected with said gate section carried thereby to open the gate sections while the carriages are in operation by swinging the gate sections in the direction that the carriages are operating.

4. A race track having a course along which the race is run, carriages operative lengthwise of the course at the margins thereof, motor means operatively associated with each of said carriages for propelling the same, means connecting said motor means for synchronous operation, a horizontally disposed gate section carried by each of said carriages on a vertical pivot and operable from a closed position transverse of the course to an open position entirely clear of the course, locking means carried by each of said carriages and releasably connected with said gate section carried thereby to retain the same in such closed position, means operatively associated with said locking means to release the same, and means carried by each of said carriages and operatively connected with said gate section carried thereby to open the gate sections while the carriages are in operation by swinging the gate sections in the direction that the carriages are operating.

5. A race track having a course along which the race is run, a carriage operative lengthwise of the course at the margin thereof, motor means operatively associated with said carriage for propelling the same, a horizontally disposed gate carried by the carriage on a vertical pivot and operable from a closed position transverse of the course to an open position entirely clear of the course, locking means carried by said carriage and releasably connected with said gate to retain the same in such closed position, means operatively associated with said locking means to release the same, and means carried by said carriage and operatively connected with said gate to open the gate while the carriage is in operation by swinging the gate in the direction that the carriage is operating including a spring loaded when the gate is closed.

6. A race track having a course along which the race is run, a carriage operative lengthwise of the course at the margin thereof, motor means operatively associated with said carriage for propelling the same, a horizontally disposed gate carried by the carriage on a vertical pivot and operable from a closed position transverse of the course to an open position entirely clear of the course, locking means carried by said carriage and releasably connected with said gate to retain the same in such closed position, means operatively associated with said locking means to release the same, and means carried by said carriage and operatively connected with said gate to open the gate while the carriage is in operation by swinging the gate in the direction that the carriage is operating including an energy storing mechanism.

7. A race track having a course along which the race is run, a carriage operative lengthwise of the course at the margin thereof, motor means operatively associated with said carriage for propelling the same, a horizontally disposed gate carried by the carriage on a vertical pivot and operable from a closed position transverse of the course to an open position entirely clear of the course, locking means carried by said carriage and releasably connected with said gate to retain the same in such closed position, means operatively associated with said locking means to release the same, and means carried by said carriage and operatively connected with said gate to open the gate while the carriage is in operation by swinging the gate in the direction that the carriage is operating, including a spring unit loaded when the gate is closed and acting when released to rapidly move the gate to the full open position, and a check unit checking movement of the gate as it approaches the full open position.

8. A race track having a course along which the race is run, a carriage operative lengthwise of the course at the margin thereof, motor means operatively associated with said carriage for propelling the same, a horizontally disposed gate carried by the carriage on a vertical pivot and operable from a closed position transverse of the course to an open position entirely clear of the course, locking means carried by said carriage and releasably connected with said gate to retain the same in such closed position, means operatively associated with said locking means to release the same, and means carried by said carriage and operatively connected with said gate to open the gate while the carriage is in operation by swinging the gate in the direction that the carriage is operating, said last means including a hydraulic system and an electrically actuated control therefor.

9. A race track having a course along which the race is run, a carriage operative lengthwise of the course at the margin thereof, motor means operatively associated with said carriage for propelling the same, a horizontally disposed gate carried by the carriage on a vertical pivot and operable from a closed position transverse of the course to an open position entirely clear of the course, locking means carried by said carriage and releasably connected with said gate to retain the same in such closed position, means operatively associated with said locking means to release the same, and means carried by said carriage and operatively connected with said gate to open the gate while the carriage is in operation by swinging the gate in the direction that the carriage is operating, said last means including a power system and an electrically actuated control therefor.

10. A race track having a course along which the race is run, a carriage operative lengthwise of the course at the margin thereof, motor means operatively associated with said carriage for propelling the same, a horizontally disposed gate carried by the carriage on a vertical pivot and operable from a closed position transverse of the course to an open position entirely clear of the course, locking means carried by said carriage and releasably connected with said gate to retain the same in such closed position, means operatively associated with said locking means to release the same, and means carried by said carriage and operatively connected with said gate to selectively open or close the gate, said last means comprising a hydraulic system.

11. A race track having a course along which the race is run, a carriage operative lengthwise of the course at the margin thereof, motor means operatively associated with said carriage for propelling the same, a horizontally disposed gate carried by the carriage on a vertical pivot and operable from a closed position transverse of the course to an open position entirely clear of the course, locking means carried by said carriage and releasably connected with said gate to retain the same in such closed position, means operatively associated with said locking means to release the same, and hydraulically actuated means carried by said carriage and operatively connected with said gate to open the gate while the carriage is in operation by swinging the gate in the direction that the carriage is operating.

12. A race track having a course along which the race is run, a carriage operative lengthwise of the course at the margin thereof, motor means operatively associated with said carriage for propelling the same, a horizontally disposed gate carried by the carriage on a vertical pivot and operable from a closed position transverse of the course to an open position entirely clear of the course, locking means carried by said carriage and releasably connected with said gate to retain the same in such closed position, means operatively associated with said locking means to release the same, and means carried by said carriage and operatively connected with said gate to selectively open or close the gate, said last means comprising a spring loaded when the gate is closed, a hydraulic system, and an electrically actuated control for said hydraulic system, the hydraulic system being operable to close the gate and load the spring.

13. A race track having a course along which the race is run, a carriage operative lengthwise of the course at the margin thereof, motor means operatively associated with said carriage for propelling the same, a horizontally disposed gate carried by the carriage on a vertical pivot and operable from a closed position transverse of the course to an open position entirely clear of the course, locking means carried by said carriage and releasably connected with said gate to retain the same in such closed position, means operatively associated with said locking means to release the same, and means carried by said carriage and operatively connected with said gate to open the gate while the carriage is in operation by swinging the gate in the direction that the carriage is operating, said last means comprising an energy storing mechanism loaded when the gate is closed, a hydraulic system, and an electrically actuated control for said hydraulic system, the hydraulic system being operable to close the gate and load the energy storing mechanism.

14. A race track having a course along which the race is run, a carriage operative lengthwise of the course at the margin thereof, motor means operatively associated with said carriage for propelling the same, a horizontally disposed gate carried by the carriage on a vertical pivot and operable from a closed position transverse of the course to an open position entirely clear of the course, locking means carried by said carriage and releasably connected with said gate to retain the same in such closed position, means operatively associated with said locking means to release the same, and means carried by said carriage and operatively connected with said gate to open the gate while the carriage is in operation by swinging the gate in the direction that the carriage is operating comprising a spring unit storing energy and a hydraulic system supplementing the action of the spring unit.

15. A race track having a course along which the race is run, a carriage operative lengthwise of the course at the margin thereof, motor means operatively associated with said carriage for propelling the same, a horizontally disposed gate carried by the carriage on a vertical pivot and operable from a closed position transverse of the course to an open position entirely clear of the course, locking means carried by said carriage and releasably connected with said gate to retain the same in such closed position, means operatively associated with said locking means to release the same, and means carried by said carriage and operatively connected with said gate to open the gate while the carriage is in operation by swinging the gate in the direction that the carriage is operating, the gate including a column, a plurality of vertically spaced arms projecting from the column, vertically spaced substantially parallel front beams attached to certain of said arms on the column and extending lengthwise of the gate, posts between the beams, diagonal braces between the beams, an intermediate beam attached to another of said arms on the column to be horizontally offset from the front beams and extending substantially parallel thereto, struts between the front beams and the intermediate beam, and diagonal braces between the front beams and the intermediate beam.

16. A race track having a course along which the race is run, a carriage operative lengthwise of the course at the margin thereof, motor means operatively associated with said carriage for propelling the same, a horizontally disposed gate carried by the carriage on a vertical pivot and operable from a closed position transverse of the course to an open position entirely clear of the course, locking means carried by said carriage and releasably connected with said gate to retain the same in such closed position, means operatively associated with said locking means to release the same, and means carried by said carriage and operatively connected with said gate to open the gate while the carriage is in operation by swinging the gate in the direction that the carriage is operating, the gate including a column, a plurality of vertically spaced arms projecting from the column, vertically spaced substantially parallel front beams attached to certain of said arms on the column and extending lengthwise of the gate, posts between the beams, diagonal braces between the beams, an intermediate beam attached to another of said arms on the column to be horizontally offset from the front beams and extending substantially parallel thereto, struts between the front beams and the intermediate beam, diagonal braces between the front beams and the intermediate beam, and a tie member extending downwardly and outwardly from the column to the lowermost front beam at a point remote from the column.

17. A race track having a course along which the race is run, a carriage operative lengthwise of the course at the margin thereof, motor means operatively associated with said carriage for propelling the same, a horizontally disposed gate carried by the carriage on a vertical pivot and operable from a closed position transverse of the course to an open position entirely clear of the course, locking means carried by said carriage and releasably connected with said gate to retain the same in such closed position, means operatively associated with said locking means to release the same, and means carried by said carriage and operatively connected with said gate to selectively open or close the gate including a spring unit loaded when the gate is closed and acting when released to rapidly move the gate to the full open position, and a check unit checking movement of the gate as it approaches the full open position, said last means also including a hydraulic system and an electrically actuated control therefor, the hydraulic system including a cylinder and piston coupled to each of said units, a single main control valve controlling flow of fluid to and from each end of each cylinder, a loading valve operable to set the main valve so the gate is closed causing loading of the spring unit, by-pass valves between the ends of the cylinders, a release valve operable to open the by-pass valves so the gate opens, and the electric system including electric operating means for the loading valve and release valve and control switches for the said electric operating means.

EDWARD M. SMITH.
CHARLES E. WHITTAKER.
JOHN S. GOODWIN.

REFERENCES CITED

The following references are of record in the file of this patent:

UNITED STATES PATENTS

| Number | Name | Date |
|---|---|---|
| 368,522 | Elliott | Aug. 16, 1887 |
| 647,166 | Stedeker | Apr. 10, 1900 |
| 673,997 | Chapman | May 14, 1901 |
| 1,259,060 | West | Mar. 12, 1918 |
| 1,605,167 | Bunker | Nov. 2, 1926 |
| 2,414,984 | Steele | Jan. 28, 1947 |